Patented July 13, 1948

2,445,137

UNITED STATES PATENT OFFICE 2,445,137

CONVERSION OF FURFURYL-ALCOHOL

Eduard Farber, New Haven, Conn., assignor to Polyxor Chemical Co., Inc., a corporation of New Jersey No Drawing. Application January 27, 1944, Serial No. 519,952

7 Claims. (Cl. 260—92.6)

My invention relates to converting furfuryl-alcohol ($C_4H_3O$—$CH_2OH$), which in its normal state is a water soluble liquid, into oily materials of greater viscosity that are insoluble in water and various other common solvents, and usually finally into an infusible solid, more or less resinous or resin-like, that is insoluble in water and in many common solvents such as ethyl alcohol, acetone and carbon tetrachloride, for example, and which can be molded by heat and pressure as described hereafter. Chemically the change appears to involve the release of water and aldehyde, with condensation between the changed molecules of the alcohol and therewith the formation of larger molecules.

Briefly, I have discovered that while furfuryl-alcohol and concentrated nitric acid tend to unite with extreme rapidity and explosive violence, this alcohol can be converted into the solid infusible resinous or resin-like product in a wholly practical manner by means of nitric acid in catalytic quantities, or by means of nitric acid supplemented by various other materials all in catalytic quantities, and that in arriving at the final end product the reaction passes through stages where the oily liquids are formed. Furthermore, that the reaction leading to or toward the infusible solid can be so controlled, that is to say, can be carried on either so rapidly or so slowly throughout either the whole of the reaction or at any part of it as the operator may wish, that the oily liquids can be isolated and stabilized when desired, and thus made available for any purpose they can serve, for example as intermediates for transformation into the solid infusible form at some later time, or as another alternative, the partly reacted mixture or a portion of it can be made use of to obtain the final solid form at a desired place and in appropriate distribution.

I am aware that it has been proposed heretofore to produce resinous solids by reacting furfuryl-alcohol with acids. The prior known practices however require the use of relatively large quantities of the acids, with the result that either acid remaining in the resinous product renders the product undesirable for various purposes, or a further operation must be employed to remove the reacting acid from the resin; to the contrary my process requires such small quantities of acid that the quantity used with my process in any instance need not be sufficient to impair the usefulness of the resinous solid (when this is sought), for most purposes at least, and accordingly no operation to remove the acid from such a product is necessary excepting possibly in rare instances. Further, the reactions with the prior known methods are substantially uncontrollable and reach the stage where a resinous infusible product is formed quickly, with the result that no intermediate product is obtainable, even if any are found; with my process to the contrary, useful intermediates are both formed and obtainable as before indicated.

A specific example of my invention and some applications of it will aid the description of its generic nature. All proportions recited in this specification and the claims are by weight. The quantities recited assume the pure substances; whenever accordingly a materially impure agent is used (for example, an impure furfuryl-alcohol, or a dilute acid) the quantity of the impure agent to be employed is at least that quantity which contains the herein indicated quantity of the pure agent, except as this rule may be varied due to the fact that my process can be carried out with certain varied proportions as appears hereinafter.

The example: Mix about one (1) part of water with about one (1) part of nitric acid of about 80% $HNO_3$, and mix this mixture into one hundred (100) parts of furfuryl-alcohol. Hold the complete mixture at about 25° C., with or without the application of heat or cooling as may be necessary, and stirring or otherwise agitating the mixture as may be necessary to prevent separation of its components. In about one (1) hour more or less (the actual time depending on the purity of the materials and extraneous conditions not necessary to discuss here), the reaction comes to completion and the solid infusible product is formed. Should it be desired to shorten the time, this can be done by using a higher temperature, applying heat or cooling as may be necessary to obtain the desired temperature and reaction rate at given stages; the higher the temperature the more rapid is the reaction until at about 100° C. the reaction comes to completion and the solid end product is formed very quickly. Contrariwise the reaction can be slowed down, should this be required, by cooling the mixture to a lower temperature. Temperatures can be used in this manner to control the reaction rate at any stage or stages of the reaction. However if before the reaction comes to completion, for example if after about one-half hour from the beginning of the operation with a temperature of 25° C., the mixture is allowed to stand quietly, it will separate into two parts, one primarily water containing most of the acid and the other a more viscous liquid of an oily nature. If now the acid is neutralized (for example by adding an alkali), or if the watery fraction is removed from the oily reaction product and the remnant of acid in that product neutralized, the reaction proceeds no further due to the removal of the acid, and the oily reaction product is stable; the same result is obtainable by removing the acid from the oily reaction product by any other means. On the other hand if the separated oily reaction product and the water-acid mixture are allowed to stand quiescent in contact with each other, at the same or at a higher or even at a somewhat lower temperature, the reaction will continue due to the fact that the acid still has access to the alcohol, but in this case the reaction will continue at a relatively lower rate due to the fact that the access of the acid to the reacting product is only at the date of diffusion. The stirring mentioned before is simply to keep the acid well mixed with the alcohol and its partially reacted product and thus hasten the reaction. If the reaction is thus continued with access only by diffusion, the same intermediate and ultimate end products are formed, but are formed only after, respectively, considerably more time than is required if the components of the mixture are kept well mixed, except as the time may be reduced by temperatures above the initial temperature of 25° C. Under the same conditions an oily reaction product can be obtained in somewhat less than one-half hour from the start, but then the liquid will be less viscous; after more than one-half hour, the oily liquid obtainable is more viscous; other things being the same, the degree of viscosity depends on the length of time of the reaction, up to the time the solid product is formed.

The solid reaction product is the ultimate end product of the reaction, and the quantity of acid remaining in it in this case is so small as to be negligible, at least for most uses. If desired the included acid can be neutralized, or it can be removed, for example by washing with water. If desired the water of the reaction mixture, with any wash water, can be removed by filtering, drying, or other procedure.

The solid product is suitable for various purposes. For example, it can be used as a filler in the molding of plastics. Again, with the addition of a binder, and with or without the addition of wood flour or other materials used as fillers in the plastic industry, it can be molded and set into desired shapes; for example the solid as recovered can be mixed with a portion of another batch of the same kind of mixture that is at a stage where an oily intermediate exists (or can be mixed with a previously stabilized oily product of the reaction to which has been added some nitric acid and a diluent in the proportions appearing herein or some other resinifying agent), and this mixture molded. On drying the whole is firmly set in the shape given it by the mold. Heat may be applied to hasten the completion of the setting. Likewise the oily intermediates can serve various purposes and in various ways. Two examples are given immediately above. As another example, the partially reacted mixture, i. e. when at an oily stage, can be applied to textiles, or to paper, or to other articles, or to fibers for fibrous products; the reaction then continues on the articles and/or fibers and the final infusible resinous product is secured on the article and/or intimately mixed with the fibers. As another alternative, a previously stabilized oily intermediate product of the reaction can be applied to fibers, or to fibrous or other products, with the addition of a suitable conversion reagent; for example, the stabilized oil can be emulsified with water (a relatively large quantity can be used if desired) to which nitric acid has been added in, say, some of the proportions herein indicated, or to which some other resinifying reagent has been added such as sodium borate, a detergent of an acid nature, etc. for example with the result that on drying again the resinous solid is found on and in intimate relation with the material or article treated. If only a small quantity of the oily product is used on, say, a fibrous material, say a quantity of the mixture of the oily product and the water-acid solution that is of the order of from about 1% to 5% of the weight of the fibrous material, the treatment increases the wet strength of the material to a considerable degree, while relatively larger quantities of the oil render the fibrous material waterproof, resistant to most acids, and impermeable to many organic liquids, like solvents or oils. Still again, an intermediate oily material of rather high viscosity, containing at least a trace of nitric acid and usually some diluent, or containing some other resinifying reagent, can be used as an adhesive or glue that sets on the application of heat.

It will be observed that the foregoing results are achieved by controlling the reaction, specifically by establishing the rate of the reaction at such a value that it proceeds without explosive violence, and at such a value at, at least, an intermediate stage that an oily intermediate product is recognizable and made available for the use to which it is to be put; for example, in order to apply the oily reacting mixture to paper, the reaction is made to take place at an oily stage at such a low rate that the reacting mixture can be applied to the paper to the desired extent before the reaction comes to the final solid resinous stage. In some cases also, i. e. when the stabilized form of an oil is desired, the result is achieved by causing the reaction to take place at such a low rate at, at least, the stage where the oil of the desired viscosity is obtained, that this oil is recognizable and can be stabilized before conversion to an oil of a higher viscosity or to the final solid product. At other stages the reaction can be made to take place at the same rate or at higher or lower rates, as may be necessary or as the economics of the situation may make desirable. Primarily the reaction rate at any moment is controllable by the quantity of acid then present, the quantity of diluent (water in the above example) then present, the momentary temperature of the reacting mixture (controllable by the application of heat or cooling if necessary), and the degree of mixing of the constituents of the reacting mixture. I contemplate such an employment of these factors in any instance as the circumstances of the situation may make desirable.

Coming now again to the more generic aspects of my invention:

As before indicated, my method of converting furfuryl-alcohol consists, speaking generally, in bringing together the alcohol, a catalytic quantity of nitric acid (or catalytic quantities of nitric acid and another or other materials as hereafter discussed), and usually a diluent, and maintaining the acid accessible to the components of the mixture, either uninterruptedly or at intervals, until the resulting reaction comes to completion or, in the alternative, until some desired intermediate stage is reached, and doing this with or without the application of heat or cooling to the reacting mixture, and with or without mechanical agitation to maintain the constituents well mixed, throughout the whole or at some stage or stages of the reaction, and with or without the addition or subtraction of acid or diluent or both at some stage or stages, as the desired control may make necessary or desirable.

Generally speaking, the furfuryl-alcohol may be the pure substance or it may be impure. For example, it may be the unrefined alcohol, it may contain water in varying amounts, it may have organic substances mixed with it, for example solvents. However, the catalytic activity of quite small quantities of nitric acid (and also the catalytic activity of small quantities of nitric acid and supporting or supplementing materials), depends to some extent upon the condition or purity of the furfuryl-alcohol. The present usual commercial alcohol, which is of a rather dark color, shows some variations depending on its age and some unknown impurities which seem to form or make their presence manifest during storage. Before using such furfuryl-alcohol I prefer to rectify and stabilize it (and the same procedure can be followed with younger and lighter forms of the alcohol also) by adding traces of an alkali to the alcohol and distilling this mixture; the distillation can be made under about atmospheric pressure, although distillation under reduced pressures yields substantially the same results. The distillate, at least after the very first part of it, is the desired alcohol. For example, 1000 grams of commercial furfuryl-alcohol may be mixed with a solution of from about 1 to about 10 ccm. of water and from about 0.5 (five-tenths) to about 5 grams of sodium hydroxide (NaOH), and the mixture of these three constituents distilled. The sodium hydroxide is dissolved in water only as a convenient means for distributing the alkali through the alcohol and accordingly the quantity of water can be varied considerably. The first small part of the distillate (it may be only a few drops) contains water, and I discard it. The remainder of the distillate is, apparently, substantially pure furfuryl-alcohol of a light yellow color which remains unchanged even after rather long storage and which is practically unaffected by light and air. Ordinarily light and air tend to darken commercial furfuryl-alcohol. Although the alcohol so treated is in these respects more stable than the crude product, it is more readily converted by small quantities of the acid than the crude form.

This method of producing a light colored furfuryl-alcohol that is stable during usual storage, or stabilizing one that is light colored at the time, can be applied also to furfuryl-alcohol that is to be used for purposes other than resinification.

This matter of rectifying and stabilizing furfuryl alcohol, is the subject of my copending application for patent Serial No. 644,191, filed January 29, 1946.

Primarily the resinfication of the furfuryl-alcohol of my process is brought about by nitric acid; at least some nitric acid must be used in every instance although it may be supplemented by another or other materials as mentioned before and as appears hereafter. Pure 100% nitric acid however reacts spontaneously and explosively with the alcohol, except at very low temperatures. In order therefore to avoid rapid local reactions with the alcohol, which may be of nearly explosive violence, and also because of the difficulties of measuring accurately in a highly concentrated form the small quantities of acid that may be used, I prefer to use a diluted nitric acid, for example such as one of the commercial forms between 36° and 42° Bé., to which I add additional diluent (e. g. water) as may be necessary to obtain the desired quantity of diluent. For example, 100 parts of furfuryl-alcohol may be mixed with sufficient of one of those commercial forms to provide about 0.02 (two one-hundredths) of a part of pure nitric acid and about the same quantity of a diluent. For these proportions I may take about 0.04 (four one-hundredths) of a part of 36° Bé. acid without the addition of further diluent, or I may take a more concentrated form of the acid and add, e. g. water, to obtain this desired proportion. If this alcohol-acid-diluent mixture is stirred continuously at, say, 25° C., the mixture reacts slowly and produces a water-insoluble oil in a few hours and produces the solid infusible product after a longer period. As before indicated however, the reaction or any part of it can be speeded up by heating. Speaking generally, the proportions of acid to alcohol that can be used vary widely; for each 100 parts of the alcohol anywhere from about 0.003 (three one-thousandths) of a part of (pure, 100%) nitric acid to about 10 parts of (pure, 100%) nitric acid may be used. Other things being equal, the greater the quantity of acid the more rapid is the reaction, and the smaller the quantity of acid the more slowly does the reaction start initially. Especially when small quantities of nitric acid are used, the effects of the acid can be enhanced as it were, and the quantity of nitric acid itself required to produce a certain effect within a given time under given conditions, can be reduced still further and sometimes other advantages secured, by the use therewith of various other materials, also in catalytic quantities. The effect of such additions is less pronounced when larger quantities of nitric acid are used. Speaking generally, any material of an acidic nature can be used to thus supplement or support the nitric acid. For example, hydrochloric acid is especially effective as such a supporting or supplemental reagent. Boric acid also can be used effectively, although when used alone, i. e. without nitric acid, boric acid in small relative quantities is only slightly active on the alcohol. Also any of the organic nitro derivatives can be used, e. g. mono-nitrobenzol, dinitrobenzol, nitro-phenol and ortho-nitro-diphenyl; these latter convert furfuryl-alcohol rather slowly on heating, when used alone, but in the presence of at least traces of nitric acid appear to have much greater activity. The quantity of such a supporting or supplemental catalyst to be used in any instance may be anything from, say, a quantity about equal to the quantity of nitric acid used with it down to, say, about one-fifth (⅕) the quantity of nitric acid. The following examples illustrate the effects of supporting catalysts: If about 0.06 (six one-hundredths) of a part of nitric acid is added to about 4 parts of water and this solution mixed with 100 parts of furfuryl-alcohol, and external heat applied to heat this mixture to boiling and thereafter maintain it at this temperature, the reaction is carried to completion and the final solid infusible reaction product is obtained rather quickly; but if the mixture is once brought to boiling and then removed from the source of heat and allowed to cool, the reaction proceeds slowly, speaking relatively. On the other hand, if 0.025 (two and one-half one-hundredths) of a part of nitric acid and 0.006 (six one-thousandths) of a part of hydrochloric acid are added to 4 parts of water, and this solution is mixed with 100 parts of the furfuryl-alcohol, and this mixture heated to boiling, thereafter the mixture will continue to boil even if the external heating is discontinued, provided it is not subjected to any special cooling, and the solid infusible reaction product is obtained in a few minutes. Again, if 0.05 (five one-hundredths) of a part of nitric acid and 0.05 (five one-hundredths) of a part of hydrochloric acid are added to 2 parts of water and this solution mixed with 100 parts of furfuryl-alcohol at room temperature, the mixture reacts spontaneously although it may be after a noticeable period of delay; a slight heating shortens the period. If no cooling is applied the temperature of this mixture then rises more or less gradually to the boiling point and the reaction in the last stages is almost explosive, producing the solid infusible product. Generally speaking, other things being the same, the larger the quantity of the catalysts for a given quantity of the alcohol, the more is the tendency to and the more pronounced is the explosive nature of the reaction, and this is true regardless of whether nitric acid alone is used as the catalyst or whether a supporting or supplemental catalyst is added. E. g., if in the last example above the quantities of the two acids are reduced by about one-quarter or one-half, say if about 0.035 (three and one-half hundredths) of a part of nitric acid and a similar amount of hydrochloric acid are used, instead of 0.05 (five one-hundredths) of a part of each, and if the heat loss from the containers is about that usually experienced, the reaction once initiated, by heating if necessary, proceeds much more slowly and produces an infusible solid without explosive violence at any stage. The quantity of acid employed therefore, is one of the factors whereby the reaction can be controlled, and not only can the quantity of acid to be used initially in any instance be chosen with this in mind, but also the rate of the reaction can be changed at any stage by changing the effective quantity of acid in the reacting mixture, i. e. by adding more acid or by neutralizing or withdrawing a portion of the initial acid.

The primary functions of the diluent of my process are to provide a second factor for controlling the speed of the reaction throughout the whole or at any part of the reaction, and to act as a carrier for the acid or acids and thereby render unnecessary any other precautions against localized reactions of an explosive nature in the furfuryl-alcohol. As a diluent, substantially any material can be used that does not have a deleterious action. Water is the most readily available diluent, and for brevity I shall refer only to water hereafter for the most part, it being understood that what is said here about water applies to other diluents also. The function of preventing rapid local reaction is accomplished by mixing the acid or acids with the water (or using an already sufficiently diluted acid as before illustrated) and adding the acidic mixture or solution to the furfuryl-alcohol as before described; when the water is to serve this purpose, at least sufficient water is used to prevent the undesired localized reactions. Additionally however, other things being the same, the greater the quantity of water the lower is the rate at which the reaction proceeds, and usually the greater is the quantity of acid or acids used. Should the alcohol or the acid be accompanied by water in relatively material quantities, these quantities are to be taken into consideration in determining the quantity of water to be included in the reacting mixture; that is, the quantities of water herein prescribed are to be understood as reduced accordingly insofar as may be necessary or desirable, but in view of the non-critical nature of the water proportions any water with the alcohol or acid can be neglected except when very small quantities of water and acid are to be used. Not only can the initial quantity of water to be used in any instance be chosen with reference to the initial reaction rate desired, but also water can be added to the reacting mixture at any stage to produce a rate thereafter lower than it would be otherwise, or water can be abstracted from the mixture at any stage to produce a rate thereafter higher than it would be otherwise. When water is added to or taken from a reacting mixture, acid also, if desired, may be added, or neutralized or taken away, or vice versa, to more or less compensate for the acid taken away in the removed water, or to modify or enhance the effect of the change in the water content. The quantity of water used throughout the whole or any stage of the reaction may vary widely, i. e. for 100 parts of the alcohol the quantity of water may be anything from about 0.01 (one one-hundredths) of a part to apparently any number of parts whatsoever. An example of the use of a very small quantity of water has been given above when discussing the quantity of nitric acid. Toward the opposite end of the range, for example: a mixture of 100 parts of the alcohol, 1 part of nitric acid and 10,000 parts of water, at about 25° C., reacts to the production of an only intermediate product in about 5 hours. Materially enlarging the quantity of water in this or any other example only lengthens the time of the reaction.

As to temperature, the rule is that the higher the temperature of the mixture at any moment the higher is the rate at which the reaction proceeds at that moment, and with small quantities of acid the higher the initial temperature the more promptly the reaction starts. With relatively small quantities of acid it may be necessary to apply heat to start the reaction, or to start it in a reasonable time. Speaking generally however, the reaction and each part of it will take place at the lowest temperature that is practical for the operations. It appears even that with sufficiently low and controlled temperatures, the reaction can be brought about non-explosively with nitric acid alone in proportions above indicated, i. e. without the aid of a diluent. At the other end of the range, the maximum temperature is that at which the mixture boils. With sufficiently large quantities of acid, at least with limited quantities of the diluent, no application of heat will be necessary, and contrariwise if a properly small quantity of acid and sufficient diluent is used, no cooling will be necessary, i. e. the reaction, with the surrounding temperatures and conditions normally encountered, will be both sufficiently low and economically fast to meet the conditions in hand. In other situations the application of heat or cooling to the reacting mixture may be necessary or desirable throughout the whole or some part or parts of the desired reaction. For example, cooling can be used to prevent an explosively high rate of reaction at some or all stages, or heat at starting can be applied to start the reaction promptly or to carry it on at a desired high rate during a starting period. It is not necessary that the same temperature be maintained throughout the reaction. As before indicated the reaction is exothermic, and the temperature of the reacting mixture can be permitted to rise as it will due to this fact, except where the resulting rise in the reaction rate is too great in a particular instance. These facts have been illustrated above. Additionally the following examples illustrate the relative effects of varying the proportions of water and acid and varying the temperature; each of these examples assumes the use of 100 parts of furfuryl-alcohol, assumes that the mixture is formed in the manner before described, assumes that the constituents of the mixture are maintained well mixed, and assumes that the mixture is maintained at the temperature given throughout the reaction, and in each instance the time given is the approximate time required to produce a water insoluble, viscous oil: With from 0.5 (five-tenths) of a part to 1 part of water, 0.02 (two one-hundredths) of a part of nitric acid, at 25° C., 4 to 5 hours; at 100° C., 1 hour. With from 0.5 (five-tenths) of a part to 1 part of water, 0.05 (five one-hundredths) of a part of nitric acid, at 25° C., 2 hours; at 100° C., 4 minutes. With 1 part of water, 0.09 (nine one-hundredths) of a part of nitric acid, at 25° C., 1 hour; at 100° C., almost immeasurably short time. With 100 parts of water, 0.4 (four-tenths) of a part of nitric acid, at 25° C., 4 hours; at 100° C., ½ hour. With 100 parts of water, 4 parts of nitric acid, at 25° C., 20 minutes; at 100° C., almost immeasurably short time. With 100 parts of water, 8 parts of nitric acid, at 25° C., 8 minutes; at 100° C. the reaction is explosive. With 1,000 parts of water, 0.4 (four-tenths) of a part of nitric acid, at 25° C., 5 hours. With 10,000 parts of water, 1 part of nitric acid, at 25° C., 5 hours.

Additionally as also before pointed out, mechanical mixing of the reacting mixture may be used as a factor controlling the speed of reaction at any moment. Thorough mixing increases the reaction speed by making the acid available to all parts of the alcohol, and also reduces the speed of local reactions and thereby allows all or a larger part of the total acid to be used in transforming the alcohol as a whole. When sufficient heat is applied to the mixture (and to an extent possibly when cooling is applied), the resulting convection currents in the reacting mixture may produce and maintain sufficient mixing of the components. In such cases additional mechanical mixing of the reacting mixture can have little effect. In other cases however, mechanical agitation of the reacting mixture can be used to increase the rate of the reaction, the degree to which it does this depending on the extent to which it keeps the acid well mixed with the other constituents of the mixture, or by omitting or suspending mechanical agitation the reaction rate can be reduced to its lowest value consonant with the quantities of acid and diluent and the temperature employed. The mechanical agitation can be by stirring as mentioned before, or by rocking the container, etc.

As to time, the times stated in this specification are to be understood as approximate only. As before indicated the actual time required for the reaction to reach any particular stage under any particular condition of proportions is dependent on the purity of the materials and other extraneous conditions, e. g. in some instances the rate of heat loss from the apparatus.

While it has been indicated above that there are some broad and general relations between the four factors controlling the reaction of my invention (e. g. for a given proportion of acid a sufficient quantity of diluent or a sufficiently low temperature, or partly one and partly the other, is needed to prevent a reaction or local reactions of explosive violence, and again, a little heat may be needed to start the reaction promptly in cases where a relatively small amount of acid is used), speaking generally the reaction and its control do not depend on any fixed and definite relations between those four control factors, namely quantity of acid, quantity of diluent, temperature and degree of mixing. Speaking generally, any quantity or degree of any one of these factors may be used, within the limits stated above, and the effect of the chosen quantity or degree of that factor either enhanced or reduced as desired by the use of a suitable quantity or degree of another or others of the four factors. As well within the scope of practical operations however, I contemplate relative relations of the four factors within the ranges representatively indicated in the following table. In this table it is assumed that the mixture is formed in the manner above indicated, that 100 parts of furfuryl-alcohol are used, that the reagent is nitric acid (i. e. without the addition of a supporting or supplementing material), that the constituents of the reacting mixture are maintained well mixed, and that the temperature of the mixture is held at about the value given either artificially or by reason of the exothermic nature of the reaction and ordinary radiation to the room; the time given in each instance in the table is approximately the time required to produce a water insoluble oil; the solid infusible resinous or resin-like product is obtained at variably longer times as will be understood from the above.

*Table*

| Time in minutes | Parts of Water | | | |
| --- | --- | --- | --- | --- |
| | 1 | 100 | 1000 | 10,000 |
| | With the Following Parts of Acid | | | |
| At 25° C: | | | | |
| 3 | 0.9 | 9 | 10 | 10 |
| 180 | 0.035 | 0.7 | 0.8 | 2 |
| 300 | 0.01 | 0.3 | 0.4 | 1 |
| At 100° C: | | | | |
| 3 | 0.09 | 0.3 | 0.6 | 1.5 |
| 180 | 0.009 | 0.04 | 0.3 | 1.2 |
| 300 | 0.003 | 0.02 | 0.1 | 1 |

It will be understood that my process is not limited to the values or times given in the foregoing table, but that this table is intended to indicate, in a general manner, a range of quantities and temperatures at which a desired state of reaction can be arrived at in any given time he may select. Accordingly my invention is limited to neither those figures nor to the specific examples of my process elsewhere given in this specification, except as may appear in the claims hereafter. Further, as appears from above, not only is the final end product referred to above obtainable from furfuryl-alcohol per se, but also from a partially reacted product of furfuryl-alcohol, namely an oily liquid of the kind referred to above, which is effective also to the same ends under the same conditions; i. e. is an equivalent of the alcohol in this reaction.

I claim:

1. The process of converting furfuryl-alcohol which comprises maintaining together with the furfuryl-alcohol, nitric acid in proportions ranging from three one-thousandths of a part of the acid and one part of diluent to ten parts of acid and ten thousand parts of diluent, to one hundred parts of the furfuryl-alcohol.

2. The process of converting furfuryl-alcohol which comprises maintaining together, at a temperature not higher than the boiling point of the mixture at ordinary pressure, the alcohol, nitric acid and a diluent, for each one hundred parts of the alcohol the proportions of the acid and diluent being as indicated by the following range: with one part of the diluent, from three one-thousandths of a part to nine-tenths of a part of acid; with one hundred parts of the diluent, from two one-hundredths of a part to nine parts of the acid; with one thousand parts of the diluent, from one-tenth of a part to ten parts of the acid.

3. The process of converting furfuryl-alcohol which comprises maintaining together, with the mixture at a temperature within the range of from room temperature to the boiling point of the mixture, the alcohol, nitric acid and a diluent, for each one hundred parts of the alcohol the proportions of the acid and the diluent being within the following range: with one part of diluent, from thirty-five one-thousandths to nine-tenths of a part of the acid for a temperature of 25° C., and from nine one-thousandths to nine one-hundredths of a part of the acid for boiling; with one hundred parts of diluent, from seven-tenths of a part to nine parts of the acid for 25° C., and from four one-hundredths of a part to three-tenths of a part of the acid for boiling; with one thousand parts of diluent, from eight-tenths of a part to ten parts of acid for 25° C., and from three-tenths of a part to six-tenths of a part at boiling; with ten thousand parts of diluent, from two to ten parts of acid for 25° C. and one to one and a half parts of acid for boiling.

4. The subject matter of claim 1, characterized by the fact that the reacting mixture is mechanically agitated throughout the reaction period.

5. The subject matter of claim 3, characterized by the fact that the reacting mixture is mechanically agitated throughout the reaction period.

6. The subject matter of claim 1, characterized by the fact that the reaction mixture is formed by mixing the diluent and the acid and then adding this mixture to the alcohol.

7. The subject matter of claim 1, characterized by the fact that another material, selected from the group consisting of mono-nitrobenzol, dinitrobenzol, nitro-phenol and ortho-nitro-diphenyl, is added to the mixture to enhance the action of the nitric acid, the quantity of such added material being less than the quantity of nitric acid.

EDUARD FARBER.

REFERENCES CITED

The following references are of record in the file of this patent:

UNITED STATES PATENTS

| Number | Name | Date |
|---|---|---|
| 1,665,235 | Trickey | Apr. 10, 1928 |
| 2,077,409 | Graves | Apr. 20, 1938 |
| 2,323,333 | Kauth | July 6, 1943 |
| 2,323,334 | Kauth | July 6, 1943 |
| 2,343,973 | Harvey | Mar. 14, 1944 |
| 2,345,966 | Fiedler | Apr. 4, 1944 |

OTHER REFERENCES

Dunlop Ind. and Eng. Chem., vol. 34, pages 814–817, July 1942.

Certificate of Correction

July 13, 1948.

Patent No. 2,445,137.

EDUARD FARBER

It is hereby certified that error appears in the printed specification of the above numbered patent requiring correction as follows: Column 8, line 34, for the word "only" read *oily*; and that the said Letters Patent should be read with this correction therein that the same may conform to the record of the case in the Patent Office.

Signed and sealed this 12th day of October, A. D. 1948.

[SEAL]

THOMAS F. MURPHY,
*Assistant Commissioner of Patents.*